United States Patent
Coninck et al.

(10) Patent No.: US 6,372,079 B1
(45) Date of Patent: Apr. 16, 2002

(54) PROCESS FOR WELDING HOLLOW ARTICLES

(75) Inventors: Hubert Coninck, Ath; Pierre Gilliard, Brussels; Joel Op De Beeck, Duffel; Guy Van Meulebeke, Brussels; Jules-Joseph Van Schaftingen, Wavre, all of (BE)

(73) Assignee: Solvay, S.A., Brussels (BE)

( * ) Notice: Subject to any disclaimer, the term of this patent is extended or adjusted under 35 U.S.C. 154(b) by 0 days.

(21) Appl. No.: 09/354,172

(22) Filed: Jul. 16, 1999

(30) Foreign Application Priority Data

Jul. 22, 1998 (BE) .......................................... 09800550

(51) Int. Cl.$^7$ .............................................. B29C 65/20
(52) U.S. Cl. .............................. 156/304.2; 156/304.5; 156/304.6
(58) Field of Search ........................... 156/304.2, 304.6, 156/304.5, 499, 292

(56) References Cited

U.S. PATENT DOCUMENTS

| 2,384,014 A | | 9/1945 | Cutter |
| 2,665,738 A | | 1/1954 | Caskin |
| 3,053,726 A | | 9/1962 | Larson et al. |
| 3,391,045 A | * | 7/1968 | Mojonnier et al. ...... 156/304.6 |
| 3,828,413 A | | 8/1974 | Province et al. |
| 3,841,938 A | * | 10/1974 | Grosse-Holling et al. ... 156/293 |
| 3,919,034 A | | 11/1975 | Carini |
| 4,443,288 A | * | 4/1984 | Sawada et al. .......... 156/304.6 |
| 4,764,328 A | * | 8/1988 | Matz et al. .............. 156/304.6 |
| 4,909,892 A | * | 3/1990 | Quinn et al. ................. 156/499 |
| 5,240,536 A | | 8/1993 | Kurobe |
| 5,296,075 A | | 3/1994 | Hardigg et al. |
| 5,632,845 A | * | 5/1997 | Stehle et al. ............. 156/304.2 |

FOREIGN PATENT DOCUMENTS

| DE | 9213424.6 | 3/1993 |
| DE | 196 27 742 A1 * | 1/1998 |
| DE | 19627742 A1 | 1/1998 |
| EP | 0210679 | 2/1987 |
| FR | 2.078.436 | 11/1971 |
| FR | 2.660594 | 10/1991 |
| GB | 1601468 | 10/1981 |
| JP | 60082329 | 5/1985 |
| JP | 01034722 | 2/1989 |
| JP | 01229616 | 9/1989 |

* cited by examiner

Primary Examiner—Jeff H. Aftergut
Assistant Examiner—Todd J. Kilkenny
(74) Attorney, Agent, or Firm—Venable; Marina V. Schneller

(57) ABSTRACT

Machine for welding hollow articles and process for welding these articles, for example half-shells of a plastic fuel tank, using the technique of hot-plate welding, in which the mirror is in the form of separate elements which can be moved independently. Particular processes in which the articles to be welded together are preshaped by pressing against cold-plate elements, which might not be plane, by stretching or compressing the side walls of the articles or by pressing against the walls of a mould. Process applied to the manufacturer of injection-moulded/welded fuel tanks. Use of the machine for manufacturing such tanks.

6 Claims, 3 Drawing Sheets

PROCESS FOR WELDING HOLLOW ARTICLES

Figure 1:
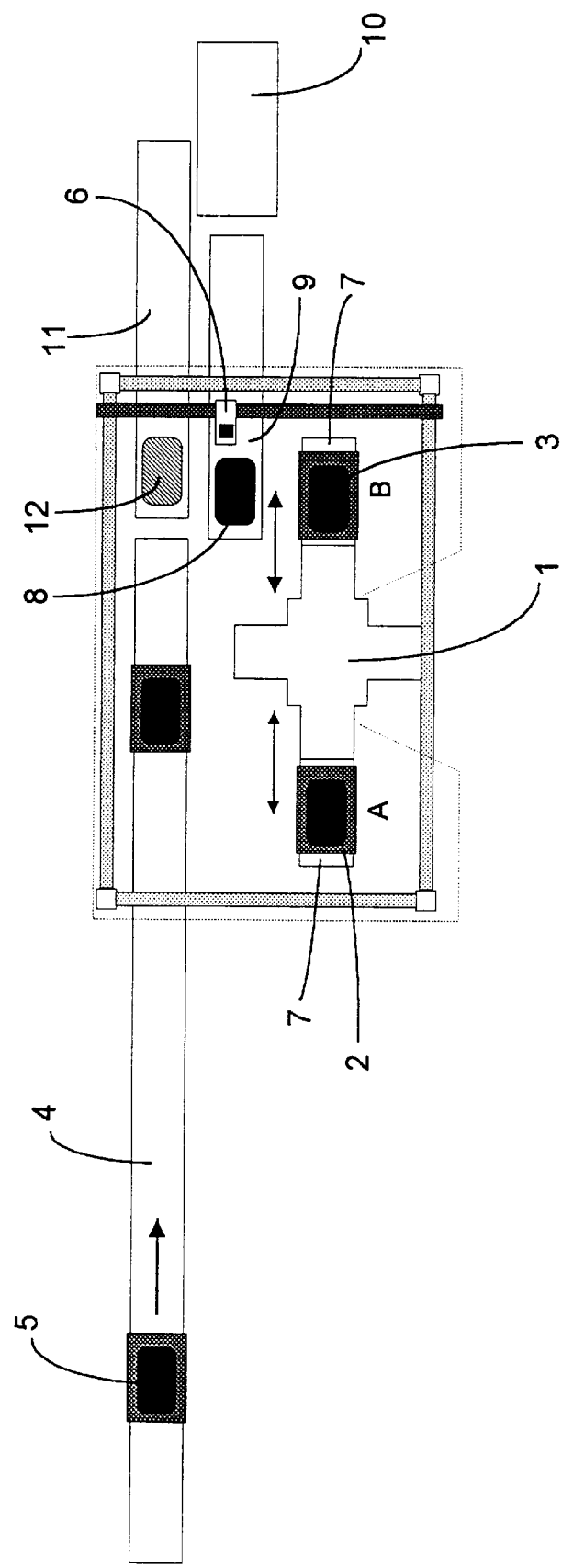

The present invention relates to a machine for welding hollow plastic articles.

It relates more specifically to a machine for producing at least one assembly using the hot-plate technique.

The manufacture of articles of complex shape often make use of techniques for assembling smaller elementary articles which it is easier to accomplish in a less sophisticated and smaller apparatus than would be required for manufacturing the complete article.

The use of plastics has, because of their excellent forming and machining properties, allowed the design and production of components and finished articles of the most varied and most complex shapes, very often exceeding by far the versatility of metals and natural materials. As the complexity of the articles manufactured from these plastics has increased, it has, however, nevertheless proved necessary to operate by assembling smaller and less complex components or articles so as to facilitate the manufacturing process and to reduce the cost thereof. Moreover, increasingly the need arises to be able to integrate, more easily than using the conventional methods, ancillary elements inside the articles.

These considerations apply particularly to the field of hollow articles which have to meet complex shape and size requirement, such as those articles used in the most diverse of fields and applications requiring high technical performance. Among such articles, may especially be found tubes and pipes of complex shape which have to fit into confined spaces, as well as bottles and containers which have to be housed in spaces having the most diverse and complex contours.

Plastics are often used for the manufacture of such hollow articles. When their external surface is highly sophisticated, techniques have sometimes been used which involve the assembly of several elements which are simpler to manufacture. In the case of plastics, one favourite technique allows complex hollow articles to be obtained by welding smaller and simpler articles.

Welding hollow plastic articles requires the local melting of the material at the location of the weld lips followed by the pressing of the articles to be welded together until the material of the lips returns to the solid state due to the effect of the cooling. The heat influx required to melt the plastic on the surface of the lips is provided by various processes which include generating heat by, in particular, ultrasound, friction, infra-red radiation or conduction from a heated tool.

One conduction technique has been well developed, namely the technique of welding using a heating tool applied to the weld lips, this technique being called hot-plate welding.

British Patent 1,601,468 describes a process and an apparatus for welding, by means of a hot-plate, rectangular parallelepipedal half-boxes, made of various plastics, which have one face missing so as to obtain a closed box. The technique is suitable for the production of easily deformable boxes whose thickness is small compared with the other dimensions of the article. The half-boxes to be welded together are each fastened inside a mould and the walls are applied against the internal surface of the mould so as to make the two half-boxes come into perfect correspondence and to present strictly parallel lips during welding.

When the assembly to be produced is of a shape and size such that the largest dimension of the hot-plate is considerable, the known welding machines are enormous and require a very long travel of the plate and, consequently, also a very long welding cycle time. The resulting heat losses due to the plate cooling must be compensated for by reheating means when the plate is in place or by heating the plate initially to a higher temperature.

Moreover, when the shapes of the assembly to be produced are very complex, it is often very difficult to design elementary articles of relatively simple shape which could reconstitute the complex assembly after welding. One corollary of this that the hot-plates required are also very complex.

The object of the invention is to provide a machine for welding hollow plastic articles which does not have the drawbacks of the known machines. In particular, it relates to machines which are more economical, smaller in size and simpler, which have a shorter cycle time and which allow accessories to be inserted into the assemblies more easily.

For this purpose, the invention relates to a machine for welding hollow plastic articles for the production of at least one assembly using the hot-plate technique, comprising a plate and means for heating this plate, means for holding and positioning the articles to be welded face to face so as to be able to bring the weld lips together, which weld lips correspond to the surface of each article, means for moving the plate between the weld lips and means for pressing the articles against the plate, in which machine the plate has at least two separate elements which are intended for heating only one portion of the weld lips of the articles and which can be moved separately.

The term "welding" should be understood to mean the operation of joining at least two articles together, which operation comprises a melting step carried out on at least one portion of the surface of each article, a step of bringing the articles into contact with each other and a final step of cooling until the molten material has returned to the solid state, for the purpose of obtaining a composite-article assembly which behaves from a mechanical standpoint as a single article.

The articles to be welded together may be of the same or different nature. In particular, the articles to be welded together may be made of pure products, chemical compositions, composite materials, alloys or natural substances, these being by themselves or as a mixture.

All types of plastic may be suitable. Very suitable plastics belong to the category of thermoplastics.

Synthetic thermoplastics are preferred. Any type of thermoplastic polymer or copolymer with a melting point below the decomposition temperature is suitable. Synthetic thermoplastics with a melting range spread over at least 10° Celsius are most particularly suitable. Examples of such materials include those which exhibit polydispersity in their molecular mass. In particular, polyolefins, thermoplastic polyesters, polyketones, polyamides and their copolymers may be used. A blend of polymers or of copolymers may also be used, as may a blend of polymeric materials with inorganic, organic and/or natural fillers such as, for example, but non-limitingly, carbon, salts and other inorganic derivatives, glass fibres, natural fibres or polymer fibres. It is also possible to use multilayer structures consisting of layers comprising at least one of the polymers or copolymers described above.

The welding machine according to the invention is suitable for carrying out spot welding, or welding in non-contiguous regions of the surface of the article to be welded together. It is also suitable for carrying out seam welding over the entire area of contact between the articles to be welded together.

The welding operation may be carried out in the machine according to the invention by adding an additional new material to that of the articles to be welded together. In the case of thermoplastics, it is preferred to use, as new material, a material contained in at least one of the articles to be welded together.

The welding operation may also be carried out without the addition of new material, simply by material interpenetration at the welded surfaces. The welding machine according to the invention is most particularly well suited to welding without the addition of new material.

The welding machine according to the invention produces assemblies of hollow plastic articles. The term "hollow articles" should be understood to mean any article whose surface presents at least one empty or concave part. In particular, the machine according to the invention is well suited to welding hollow articles which are in the form of plastic shells which are welded together edge to edge.

More than two plastic articles may be welded using the machine according to the invention. Preferably, two articles are welded together.

The machine according to the invention makes it possible to produce at least one plastic assembly simultaneously.

The hot-plate technique employed by the machine according to the invention is based on the principle of the local melting of parts of the surfaces to be welded together, by contact with a heated tool called a plate or "hot" plate. This will be made of a heat-resistant material whose surface roughness is very low so as to maximize the contact with the plastic to be melted. Any material that has a high heat capacity and can be machined to a mirror polish is suitable. However, it is necessary for the materials to be furthermore chemically inert with respect to the plastic to be welded and for them not to adhere to the latter. Among possible materials for the plates, mention may be made, in a non-limiting manner of ceramics and polished metals.

Hot-plates made of polished metal are particularly suitable. Mechanically polished or chemically polished metals are used. It is also possible for a smooth film of material to be deposited on the surface of the plates by physical or chemical means.

One advantageous solution to the problem of adhesion to the hot-plate is, as a variant, to coat the latter with a sheath of heat-resistant plastic which is inert to the material of the articles to be welded together. Examples of such plastics are fluoropolymers, such as polytetrafluoroethylene and polyvinylidene fluoride. Metal plates coated with a polyvinylidene fluoride film have been successfully used.

The machine also includes means for heating the hot-plate. Any type of heating that can be used in a machine for processing plastic articles may be envisaged. Thus, heat can be transmitted to the hot-plate by conduction, by convection or by radiation, or else the heat may be generated directly within the plate using electromagnetic techniques.

In the machine, the hot-plate may, for example, be reheated by contact with an electrical resistance element which is itself heated by the Joule effect. As a variant, it may also be immersed in a stream of hot air heated by direct contact with a hot flame or else immersed in a liquid bath maintained at high temperature. Another possible variant is to immerse it in a cavity whose walls are at high temperature. An additional variant comprises heating the plate by electrical induction in an alternating magnetic field or heating the plate by immersing it in an aqueous liquid within a microwave field.

The machine according to the invention advantageously comprises means for holding the articles to be welded together. The means for holding the articles are those which receive and support, face to face, the articles undergoing the welding operation. They are generally produced in the form of platens provided with devices for anchoring the articles.

In the machine according to the invention may be also found means for positioning the articles to be welded together. These means allow the movement bringing the weld lips of the articles together face to face to be adjusted in a precise manner. They allow these lips to be positioned with the smallest separation distance compatible with the possibility of still inserting a hot-plate into the small separating gap. Advantageously, they are also capable of adjusting the positioning of the articles in space so that the weld lips are in the best correspondence over their entire length. Any precise positioning system may be suitable. In particular, rack-type or ram-type systems may be incorporated into the machine so that the articles to be welded can be brought together in a very precise manner.

The term "weld lips" should be understood to mean those parts of the surface of the hollow articles which are heated by means of the plate and are brought into contact with each other in order to weld the articles.

In particular, the positioning means advantageously comprise means for manipulating the articles to be welded together. The term "manipulation" should be understood to mean the feeding of the hollow articles into the machine. Preferably, the manipulation of the articles also comprises the removal of the assembly from the machine after welding. The feeding of the hollow articles into the machine and the removal therefrom may, for example, be carried out by loading the machine directly using a robot or by means of an operator. They may also be carried out by transfer using an article-supporting pallet at one or more loading/unloading stations external to the machine.

The positioning means may be produced in various practical forms, comprising, in a non-limiting manner, a robot, a conveyor belt, a chain, a belt, driven rollers, guides and tunnels, by means of gravity or under the thrust of a propellent fluid.

In order to improve the precision in the positioning and in the movement of the articles the positioning means may be provided with one or more control systems comprising sensors linked to a position servocontroller. The servocontroller may equally well. belong to the category of pneumatic controllers or of electronic controllers, particularly those which comprise programmed logic elements such as programmable controllers or microcomputer systems comprising at least one microprocessor and a program recorded on a suitable medium.

The machine according to the invention must also comprise means for moving the plate. These should be understood to mean means known for inserting the plates between the weld lips before the welding operation. This machine must also comprise means for removing the plate when it has finished heating the weld lips until they start to melt at their surface. The means for inserting the plate between the weld lips and those for removing the plate after heating them may be one and the same or separate. Preferably, the same means are used for inserting the plate and for removing it after heating the lips.

The machine according to the invention also comprises means for pressing the articles against the plate and for pressing the articles together. Any means capable of keeping the articles in contact with each other under the effect of a given pressure may be suitable. It is possible, for example, to equip article-supporting platens with hydraulic or pneumatic ram systems or with screw-nut systems capable of imparting, in a lasting manner, sufficient pressure to the articles in contact with each other. The expression "sufficient pressure" should be understood to mean a pressure at least equal to that allowing interpenetration of molten plastic over the entire area of the lips. However, this pressure must remain below a certain limit compatible with there being no mechanical deformation of the non-melted parts of the articles in contact with each other and with the loss of an excessive portion of molten material flowing away in a direction perpendicular to the direction of pressing.

According to the invention, the plate has at least two separate elements intended to heat only one portion of the weld lips of the articles. The plate is therefore a composite assembly of separate elements. The term "separate elements" should be understood to mean plate sections which each have the same characteristics as the plate itself, except that the surface area is smaller. The number and the shapes of the elements are such that there is at least one way of placing all the elements one with respect to another which allows the composite plate to be reconstructed.

The plate elements may also include, as a variant, means for fastening to the adjacent plate elements so as to stiffen the reconstituted composite plate and to smooth its surface.

Preferably, the mirror comprises at least 2 separate elements. Particularly preferably the mirror comprises from 3 to 8 separate elements.

Each of the plate elements may be identical to all the others with regard to its nature and its shape. As a variant, some of the plate elements may differ in their nature or in their shape. In another variant, some of the plate elements differ both in their nature and in their shape.

The separate elements of the plate of the machine according to the invention must be able to be moved separately.

In particular, they can be moved in separate planes. They can also be moved in separate directions. Finally, they can be moved in the same sense or in opposite senses. Alternatively, any two elements of the plate can be moved separately in only one of the three criteria—plane, direction and sense. They can also be moved separately according to two of these criteria or all three of them. However, it is preferred for at least two plate elements to be able to be moved in an identical manner.

According to one particular embodiment of the machine according to the invention, when the plate is in the position for heating the weld lips of the articles to be welded together, the separate elements are arranged in an adjacent manner and cover all of the weld lips of the articles. In this case, the plate elements touch each other and make up a single plate. However, the surface area of the plate may be less than that which a plate not divided up into multiple elements would require.

The welding machine according to the invention may comprise plate elements which are all plane.

As a variant, it may also comprise plate elements in which at least one of them is not plane. In this case, the welding of articles which have weld lips not in the form of a plane is facilitated.

According to another variant, the machine according to the invention may include means for locally heating the articles to be welded together other than the hot-plates intended for heating the weld lips. These means can be used for heating areas of the articles to be welded together other than the weld lips. Sources of infra-red radiation are one example of such means. These may be present inside the machine according to the invention. As examples of such sources, mention may be made of infra-red lamps. The welding machine described above allows complex articles to be easily manufactured in a shorter time and with less energy consumption than using the conventional processes.

Consequently, the invention also relates to a process for welding hollow plastic articles in a welding cycle in which:

a) at the start of the cycle, at least two articles to be welded together are positioned so as to present their weld lips face to face;

b) at least two hot-plate elements are moved separately and brought between the weld lips of each article which are placed opposite each other, the temperature of the plate elements being sufficient to be able to melt, by contact, the plastic to be welded;

c) the articles are pressed against the two faces of the hot-plate elements for a time at least sufficient to start to melt the articles on the surface of the lips in contact with the hot-plates;

d) the articles are moved away from the plate elements;

e) the plate elements are withdrawn;

f) the articles are pressed against each other so as to bring the heated lips into contact for the time necessary for welding and for returning the molten material to the solid phase; and g) the assembly thus obtained is removed.

All the terms used in the above phrase have the same meaning as that given in the description of the above machine.

The term "welding cycle" should also be understood to mean all the operations necessary for the manufacture of at least one complete assembly resulting from the welding of at least two hollow articles. The operations of the cycle may be repeated intentionally in an unchanged order in order to produce a large number of articles identical to those obtained from the first cycle.

In accordance with the process according to the invention, the temperature of the hot-plate elements must be sufficient to be able to melt, by contact with them, the plastic to be welded. The temperature of the plate elements must be carefully tailored to the nature of the plastic used. However, it is important for this temperature not to be excessively high so as, on the one hand, not to decompose the plastic at the weld lips brought into contact with these plate elements and, on the other hand, not to melt an excessively large amount of plastic. In practice, a temperature is chosen which is below that temperature which causes decomposition of the plastic for the welding cycle time chosen.

Moreover, it is desirable for the temperature of the hot-plate elements to be maintained at a high level above the melting point throughout the time the weld lips are in contact with them.

Likewise, the time during which the articles are pressed against the hot-plate elements must be set so as at least to start to melt the articles on the surface of the lips, while still limiting the risk of too great an amount of material melting.

Preferably, care is taken to ensure that the melting of material which starts on the surface of the lips does not extend, perpendicular to the surface, over a depth greater than the thickness of the articles to be welded together.

The temperatures, pressing times and pressures exerted on the hot-plate elements may be identical for all the plate elements. Alternatively, at least one of the temperature, pressure and pressing-time parameters may be different for at least one plate element with respect to the same parameter for all the other elements.

In another embodiment of the process according to the invention, which is preferred, a step of shaping the articles to be welded together is inserted, at the start of the cycle, between the steps of positioning these articles and of moving the hot-plate elements described above, for the purpose of achieving better correspondence of the weld lips.

The term "shaping" should be understood to mean any process for modifying the curvature of the surface and/or the dimensions of the articles to be welded together, so as to improve and optimize the correspondence of the weld lips of each article with those of the article to which it will be welded.

Preferably, the shaping is carried out in the following four steps:

1) at least two plate elements, the temperature of which is below that required to cause local melting of the plastic of the lips in contact with the plate elements ("cold" plate), are moved separately and brought between the weld lips of each article which are placed opposite each other;
2) the articles are pressed against the cold-plate elements with a pressure and for a time which are necessary for deforming the profile of the weld lips and to better adjust their correspondence;
3) the articles are moved away from the cold-plate elements, and
4) the cold-plate elements are withdrawn.

The temperature of the cold-plate elements must remain sufficiently moderate to avoid local melting of the plastic with which they are brought into contact. However, the temperature may reach the level corresponding to that of softening of this plastic. The term "softening" should be understood to mean modification of the physical properties of the plastic as soon as it reaches and exceeds its HDT (Heat Deflection Temperature measured according to the ISO No. 75 standard). Preferably, the temperature of the cold-plate elements may take any value starting at this softening point and stopping at a value immediately below the temperature of the onset of the melting range of the plastic in question.

In one particular embodiment of the process according to the invention, the deformation of the articles to be welded together may be facilitated by creating at least one preferential deformation region in at least one of the articles, for example by locally varying the thickness or else by inserting deformable folds.

Another means of facilitating the deformation is to locally heat at least one precise region of at least one article or the entire article.

Another means of facilitating the deformation is also to locally deform at least one of the articles using a shaping tool which applies a force perpendicular to that already exerted by the press.

For each particular plastic, the temperature parameters of the cold-plate elements and the pressures applied against the articles and the time required to obtain good adjustments of the correspondence of the lips and suitable shaping are optimized. For each particular case, the best compromise for setting the values to be assigned to each of these three parameters will depend on the intrinsic mechanical properties of the plastic in question, on the shape of the plate elements and on the shape and size of the articles to be welded together.

In a similar manner to the case of the hot-plate elements, the temperatures, pressing times and pressures exerted on the cold-plate elements may be identical for all the plate elements. Alternatively, at least one of the parameters—temperature, pressure and pressing time—may be different for at least one cold-plate element compared with the same parameter for all the other elements.

Unlike the pressing operation during the actual welding, the pressing in the preliminary shaping step must be carried out with a pressure sufficient to deform the articles.

An advantageous variant of the process according to the invention, in the case of the use of cold-plate elements, is that in which the cold-plate and the hot-plate elements are separate regions of the same plate elements.

Another way of carrying out the shaping operation is that in which this shaping is accomplished by stretching or compressing the side walls of the articles to be welded together or by pressing these articles against the walls of a mould serving as a template. When the articles to be welded together are themselves produced in another machine located nearby the welding machine, this shaping of the articles may be carried out as soon as they leave the production machine. The mould may comprise a metal frame. A mould in the form of a metal frame is very suitable for shaping articles immediately after they have been manufactured, for example in an injection-moulding machine.

It is also possible to combine the use of cold-plate elements with the use of compression or stretching of the articles in a mould.

In one or other way of carrying out the shaping, the latter may also be facilitated by reheating the components to be shaped before welding. The reheating may be done locally on one or more carefully chosen regions of the articles. An example of local reheating before shaping is that which may be carried by out by means of infra-red radiation, by targeting the region to be reheated by means of a suitable radiation source focused onto the region to be reheated. On the other hand, the reheating may be carried out generally throughout the mass of the articles. In this case, a simple example is that in which the articles to be reheated are thermally conditioned in an oven before shaping.

In another embodiment of the process according to the invention, all or part of the shaping operation may also be carried out by pressing the articles against the hot-plate elements, immediately before the welding operation. For example, a pressure profile may be imposed during the pressing period on the hot-plate elements so that the pressure applied at the start of the period, for shaping, is different from that exerted thereafter, as soon an the plastic of the lips has started to melt and the rolling operation starts.

The process according to the invention is well suited to the welding of at least two hollow plastic articles in order to manufacture a tank. It is particularly well suited to the manufacture of fuel tanks. It is most particularly well suited to the manufacture of fuel tanks intended to be fitted into motor vehicles.

The process according to the invention is well suited to the welding of at least two hollow plastic articles obtained using the technique of injection moulding.

The invention also relates to the use of the machine as described above for the production of plastic tanks by welding at least two hollow plastic articles together.

In particular, it relates to the use of this machine for the manufacture of plastic fuel tanks. More particularly still, it relates to the manufacture of plastic fuel tanks by welding at least two hollow plastic articles together, these articles having been obtained using the technique of injection moulding.

Figures 2, 2A, 2B:
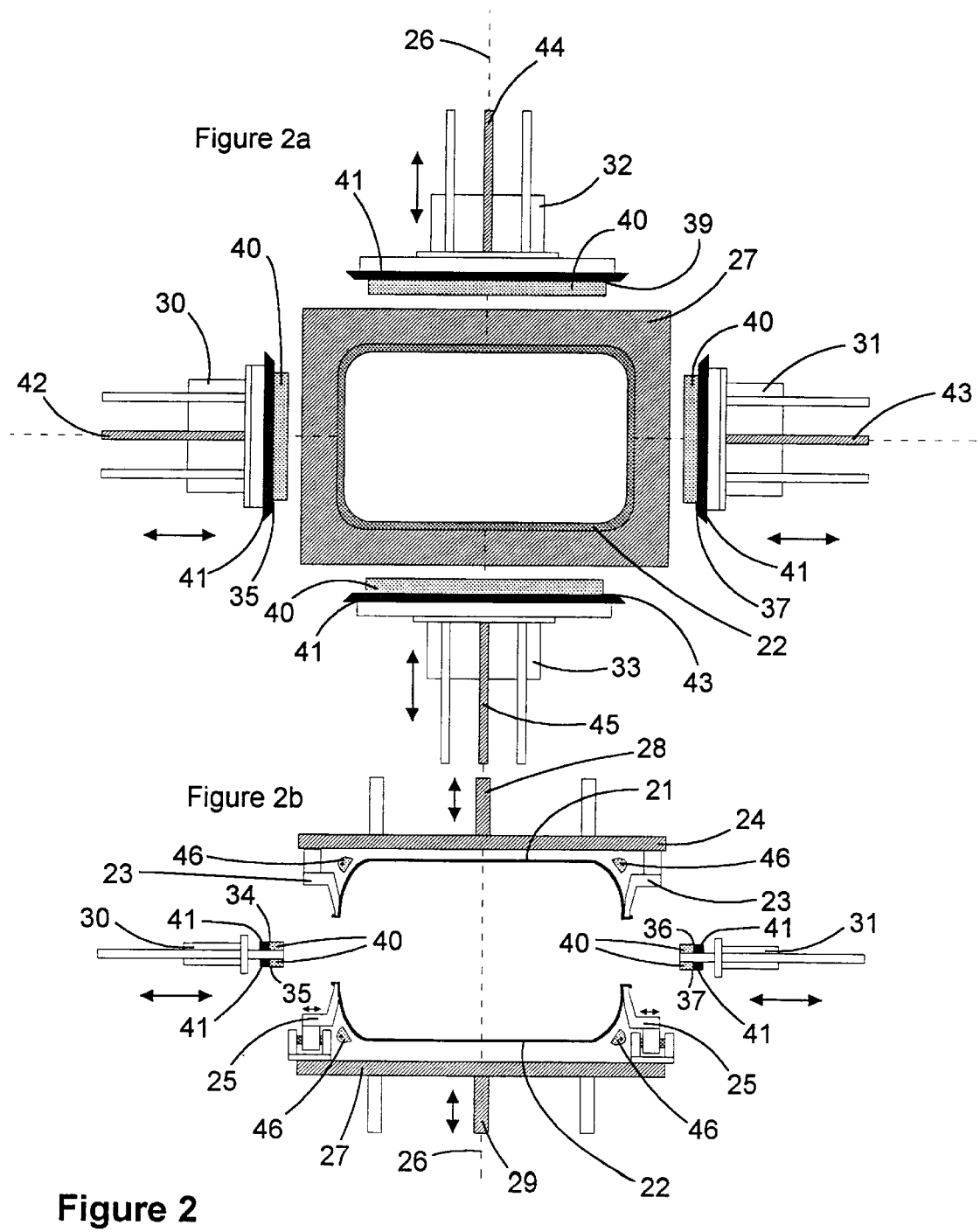
Figure 3:
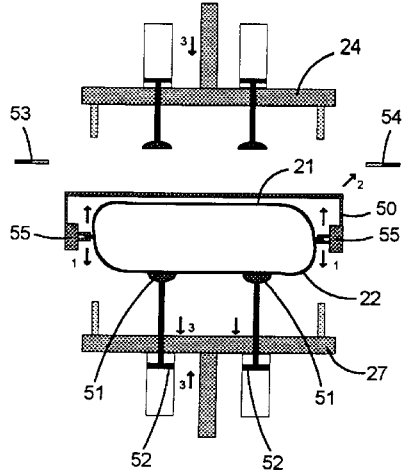
Figure 3:
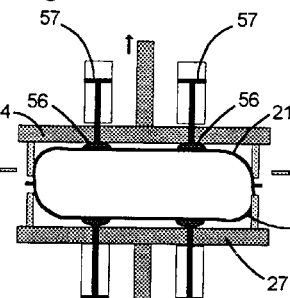
Figure 3:
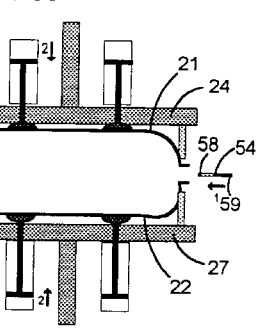
Figure 3:
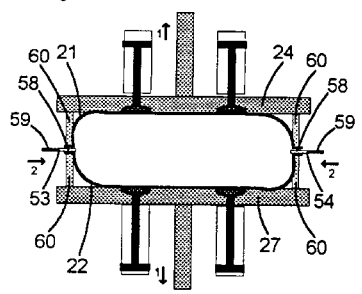
Figure 3:
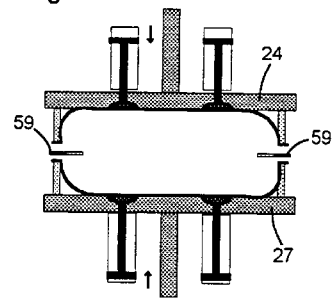
Figure 3:
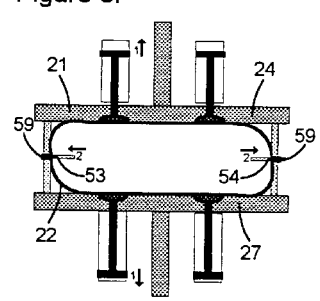
Figure 3:
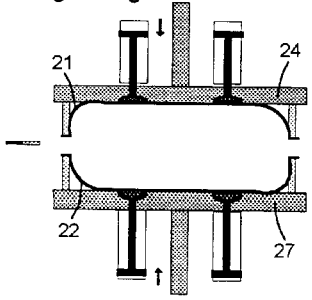
Figure 3:
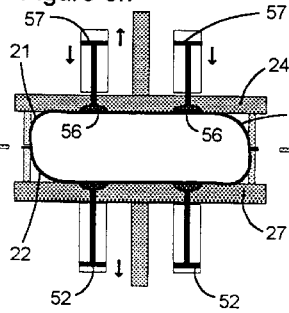
Figure 3:
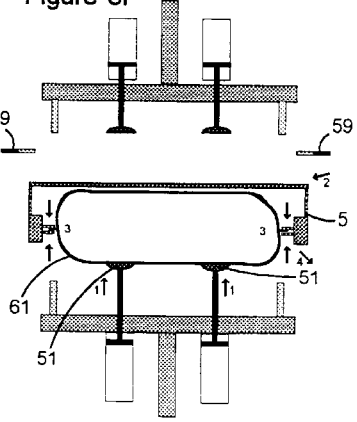

The appended FIGS. 1 to 3 illustrate in a non-limiting manner certain embodiments of the machine according to the invention, as well as of the process using a similar machine to manufacture fuel tanks from hollow articles in the form of shells obtained by injection moulding.

FIG. 1 is a general diagrammatic illustration of a welding machine according to the invention which illustrates in particular the means for manipulating the articles to be welded together.

FIG. 2 details of one particular construction of the means for positioning the articles as well as the plate elements.

FIG. 3 diagrammatically illustrates a complete cycle of the process for welding two hollow articles together, which includes a step of shaping by pressing them against cold-plate elements.

FIG. 1 shows a plan view of a machine according to the invention suitable for welding two hollow plastic shells in order to produce fuel tanks for a motor vehicle. A machine body (1) comprises two stations—a loading station (2) and an unloading station (3)—and a conveyor belt (4) which brings two plastic shells (5) into the perimeter of a gantry-type robot (6). The latter loads and unloads the shells (5) and deposits them on platens (7) located in each of the two stations (2) and (3), labelled A and B in the figure. The stations A and B operate alternately for loading and unloading, one of the stations being in the loading position while the other is in the unloading position. These loading and unloading operations are concomitant with the welding operation carried out in the body (1).

After welding, the tank (8) obtained is removed by the robot (6) and placed on the conveyor belt (9). The latter brings the tank (8) so as to face an inspection and packaging station (10). A second conveyor belt (11) is responsible for removing non-conforming rejects (12).

FIG. 2 is a plan view (FIG. 2a) and a side view (FIG. 2b) of a section in part of a welding machine according to the invention in which two plastic shells (21) and (22) are welled together in order to manufacture a fuel tank. The upper shell (21) is gripped between stationary support arms (23) carried by an upper platen (24). The lower shell (22) in gripped between arms (25) which can move parallel to the platen by means of a ram system, jointly and in the same direction and same sense, so that the position of the axis (26) of the lower shell (22) can be finely adjusted with respect to the that of the upper shell (21). The movable arms (25) are, via the ram system, fastened to a lower platen (27). The upper platen (24) and lower platen (27) are also fastened to other rams (28) and (29) which vertically position the shells to be welded together and move the latter closer together. Four plate-holders (30 to 33), located around the perimeter of the platens (24) and (27) at a height within the space bounded by the latter, each carry two plate elements (34 to 39). Each of these plate elements has a cold part (40) located towards the centre of the shells (21) and (22) and a hot part (41) located towards the outside of the latter. Precision rams (42 to 45) are used for moving the plate elements (34 to 39) and for finely positioning them. Infra-red lamps (46) are placed in the gaps left near the arms (25).

FIG. 3a shows the inside of a welding machine according to the invention at the start of a cycle, when the platens (24) and (27) are in their position furthest apart and the robot (50) inserts two plastic shells (21) and (22) into the machine and deposits them on the suckers (51) with which the end of the hydraulic pistons (52) are provided. At this moment, the plate elements (53) and (54) are in a remote position, outside the field of the platens (24) and (27). When the suckers (51) have been fastened to the lower shell (22), clamps (55) integral with the robot (50) supporting the shells and holding them against each other open and the robot (50) moves away, leaving the upper shell (21) placed on the lower shell (22). Next, the platens (24) and (27) move closer together.

FIG. 3b shows the diagram of the machine when the upper platen (24) has united with the upper shell (21) and the suckers (56) of the upper hydraulic pistons (57) have fastened the upper shell (21) to the upper platen (24). The lower platen (27) carrying the lower shell (22) has also moved upwards and the two shells (21) and (22) are placed facing each other a very short distance apart.

FIG. 3c shows that the platens (24) and (27) have moved apart by a calibrated distance sufficient to allow insertion of the plate elements (53) and (54) between the weld lips. The plate elements then move in the same plane, in opposite directions towards the axis of the plates (24) and (27). They each have a cold part (58) located towards the axis of the platens and an external hot part (59) permanently heated by an electrical resistance element embedded in its mass. The plate elements (53) and (54) stop when their cold part (58) is located in line with the plastic shells (21) and (22).

Next, the platens (24) and (27) close up on the cold-plate elements (58), as shown diagrammatically in FIG. 3d. A calibrated pressure is then applied to the platens (24) and (27) so as to give the shells (21) and (22) a final shape and to make the weld lips even. Guides (60) give the shells (21) and (22) their final shape and act as a mould. After the shells (21) and (22) have been shaped for a sufficient time, the platens (24) and (27) again move apart slightly and the plate elements (53) and (54) are moved closer together in the same plane. They stop when they present, this time, their hot region (59) in line with the shells (21) and (22), which situation is shown in FIG. 3e.

The platens (24) and (27) then close up on the hot-plate elements (59), as shown diagrammatically in FIG. 3f. After having applied a calibrated pressure to the platens (24) and (27), for the time necessary for local melting of the plastic on the surface of the weld lips, the platens (24) and (27) reopen and the plate elements (53) and (54) are moved in the opposite direction, moving away from each other in the same plane, until they lie outside the field of the shells (21) and (22), which situation is shown diagrammatically in FIG. 3g.

Next, the platens (24) and (27) are moved closer together until the weld lips of the shells (21) and (22) touch each other, which situation is illustrated in FIG. 3h.

Next, a calibrated pressure is applied to the platens (24) and (27) for the time necessary for interpenetration of the plastic of the lips and their subsequent return to the solid state. The platens (24) and (27) then open at the same time as the lower hydraulic pistons (52) and upper hydraulic pistons (57) detach the assembled tank (61) from the platens (24) and (27). At the same time, the upper suckers (56) are detached from the upper wall of the tank (61).

In FIG. 3i, it may then be seen that the robot (50) comes into place and grips the tank (61). Next, the lower suckers (51) release their hold and the tank (61) is then transferred by the robot (50) out of the internal field of the machine in order to undergo the deflashing and packaging operations (not illustrated). A new cycle can then begin again.

What is claimed is:

1. Process for welding together edge to edge hollow plastic articles in the form of plastic shells for the manufacture of a fuel tank in a welding cycle in which:

a) at the start of a cycle, at least two articles to be welded together are positioned so as to present parts of a surface of each hollow article which will be heated and brought into contact with a corresponding surface of another article and defining weld lips face to face;

b) articles are shaped in four steps as follows in order to achieve a better correspondence of the weld lips:

1) at least two cold plate elements, a temperature of which is below that required to cause local melting of the plastic of the lips in contact with the plate elements, are moved separately and brought between the weld lips of each article which are placed opposite each other;

2) the articles are pressed against the cold-plate elements with a pressure and for a time which are necessary for deforming a profile of the weld lips and to better adjust their correspondence;
3) the articles are moved away from the cold-plate elements, and
4) the cold-plate elements are withdrawn;

c) 3 to 8 separate hot plate elements are moved separately and brought between the weld lips of each article which are placed opposite each other, a temperature of the plate elements being sufficient to be able to melt, by contact, the plastic to be welded, d) the articles are pressed against two faces of the hot-plate elements for a time at least sufficient to start to melt the articles on a surface of the lips in contact with the hot-plates;

e) the articles are moved away from the plate elements;

f) the plate elements are withdrawn;

g) the articles are pressed against each other so as to bring the heated lips into contact for a time necessary for welding and for returning a molten material to a solid phase and h) the assembly thus obtained is removed.

2. Process according to claim 1, characterized in that the cold-plate elements and the hot-plate elements are separate regions of the same plate elements.

3. Process according to claim 1, wherein the hollow plastic articles are formed by injection molding.

4. Process according to claim 2, wherein the hollow plastic articles are formed by injection molding.

5. Process for welding hollow plastic articles in a welding cycle in which:

a) at the start of a cycle, at least two articles to be welded together are positioned so as to present face to face parts of a surface of each hollow article which will be heated and brought into contact with a corresponding surface of another article and defining weld lips;

b) articles are shaped in four steps as follows, in order to achieve a better correspondence of the weld lips:
1) at least two cold-plate elements, the temperature of which is below that required to cause local melting of the plastic of the weld lips in contact with the cold plate elements, are moved separately and brought between the weld lips of each article which are placed opposite each other,
2) the articles are pressed against the cold-plate elements with a pressure and for a time which are necessary for deforming the profile of the weld lips and to better adjust their correspondence;
3) the articles are moved away from the cold-plate elements, and
4) the cold-plate elements are withdrawn;

c) at least two hot-plate elements are moved separately and brought between the weld lips of each article which are placed opposite each other, a temperature of the two hot plate elements being sufficient to melt, by contact, the plastic to be welded;

d) the articles are moved away from the hot-plate elements;

e) the hot-plate elements are withdrawn;

f) the articles are pressed against each other so as to bring the heated lips into contact for the time necessary for welding and for returning the molten material to the solid phase; and g) an assembly thus obtained is removed.

6. Process according to claim 5, characterized in that the cold-plate elements and the hot-plate elements are separate regions of the same plate elements.

* * * * *